Aug. 24, 1965     S. T. CARTER     3,202,564
MEANS FOR POSITIONING A LABEL RELATIVELY TO A PICKER
Filed March 26, 1963                    7 Sheets-Sheet 1

INVENTOR.
Sidney T. Carter
BY
ATT'YS

INVENTOR.
Sidney T. Carter
BY
ATT'YS

Aug. 24, 1965 S. T. CARTER 3,202,564
MEANS FOR POSITIONING A LABEL RELATIVELY TO A PICKER
Filed March 26, 1963 7 Sheets-Sheet 3

Fig. 3

INVENTOR.
Sidney T. Carter
BY
ATT'YS

Aug. 24, 1965  S. T. CARTER  3,202,564
MEANS FOR POSITIONING A LABEL RELATIVELY TO A PICKER
Filed March 26, 1963  7 Sheets-Sheet 4

INVENTOR.
Sidney T. Carter
BY
Roberts Cushman & Grover
ATT'YS

Aug. 24, 1965  S. T. CARTER  3,202,564
MEANS FOR POSITIONING A LABEL RELATIVELY TO A PICKER
Filed March 26, 1963  7 Sheets-Sheet 6

Fig. 11

INVENTOR.
Sidney T. Carter
BY
Roberts Cushman & Grover
ATT'YS

United States Patent Office 3,202,564
Patented Aug. 24, 1965

3,202,564
MEANS FOR POSITIONING A LABEL
RELATIVELY TO A PICKER
Sidney T. Carter, Shrewsbury, Mass., assignor to Geo. J.
Meyer Manufacturing Co., Cudahy, Wis., a corporation
of Wisconsin
Filed Mar. 26, 1963, Ser. No. 268,030
26 Claims. (Cl. 156—569)

This invention pertains to labeling machines of that kind wherein labels are taken from a magazine by an adhesively-coated picker and delivered by the picker to a transfer device, such, for example, as a suction gripper pad which applies the label to the article, and relates more particularly to apparatus wherein the picker is of the separable-blade type comprising two blades disposed in the same plane. In machines of this type, the picker blades are disposed in close edge-to-edge relation when entering the magazine and applying pressure to the bottom label. Customarily, this pressure is held momentarily while the picker blades separate, while the picker is still within the magazine, each moving approximately the same distance but in opposite directions until the space between them is equal to from one-third to three-fourths of the label width. As thus separated, the picker blades remove the label from the magazine, the space between the edges of the blades providing room for the passage of the suction gripfinger so that the latter may take the label from the picker while the latter dwells at a transfer station. However, as above described, when the picker, with its blades closed, enters the magazine or holder to take a label, the bottom label in the pack must depend upon the pressure exerted against it by the picker blades to receive the intended coating of glue. Paper labels have a tendency to curl, while some labels have embossed letters or monograms. Still others may have double or triple coats of printing at certain areas which make those particular areas of the label substantially thicker than other areas. Such curl, embossing or non-uniform print thickness, when accumulated in a stack of 500 or more labels, makes it virtually impossible to insure that the bottom label will have an accurately plane surface for contact by the picker and this is true even though heavy pressure is applied to the top of the stack, for example, by a flat plate. The result is that the pressure of the picker against the bottom label is not unform and since this pressure determines the amount or evenness of glue transferred to the label surface, there is no certainty that each label will receive a uniformly thick coating of adhesive over its entire surface, although the separation of the picker blades, while the label is adhesively supported by the blades, has the effect at least theoretically, of spreading the gum.

In labeling machines of the kind in which a single article is labeled during each machine cycle and wherein it is possible to employ a suction gripper or transfer pad of a width approximating that of the label, so that, at the transfer point, the entire label is clamped between the picker and pad while the blades are being separated, the separation of the blades under such conditions does spread the gum with reasonable uniformity over the surface of the label. Of course, in such an arrangement, the picker blades must separate a distance at least as great as the width of the pad and thus, when the label is of substantial width, the separated blades occupy a very considerable space. This may not present a problem of any substantial difficulty in a machine of the kind wherein but one article is labeled during each machining cycle. However, in a machine wherein a plurality of articles are labeled during each cycle, and wherein a corresponding number of pickers and a corresponding number of transfer pads is required, space limitations make it impractical to employ pressure pads of the full width of the label, because there is not sufficient room for all of the picker blades, of the several sets, to be separated to the extent requisite for the passage of transfer pads of the full width of the label. Accordingly, in machines designed to label several articles during each cycle, it has become customary to employ a transfer pad which is so narrow as to contact the central portion, only, of the label, thus reducing the space required for the separation of the picker blades for the passage of the pad. However, as the picker blades move apart at the transfer point, the midportion of the label is not compressed between the pad and the picker blades. The label is now supported solely by the adhesion of its lateral portions to the relatively moving blades, and may adhere more strongly to one than the other. Thus, there is no certainty of a uniform distribution of gum over the entire label or that the label will not have twisted when it arrives at the article to be labeled.

As contrasted with labeling machines wherein the picker blades separate while within the magazine, the machine of the present invention provides for removal of the picker from the magazine while its blades are still closed.

The present invention has for an object the provision of means operative to insure a complete and uniform coverage of adhesive on each label. A further object is to provide means whereby, in a labeling machine in which the label is removed from the magazine by a separable-blade, gum-coated picker and delivered by the latter to a suction-type transfer pad of a width substantially less than that of the label, the gum will be uniformly spread over the entire area of the label as the picker blades separate. A further object is to provide means whereby, in a labeling machine of the kind in which a picker of the separable-blade type is employed, means is provided for pressing the entire area of the label against the picker after the label has been withdrawn from the magazine but before it is brought into contact with the transfer pad. A further object is to provide means whereby, in a labeling machine of the type in which a plurality of articles are labeled during each cycle of the machine and wherein the machine comprises a plurality of separable-blade pickers and corresponding transfer pads for each article to be labeled during a given cycle, means is provided which is operative to insure a substantially uniform coating of adhesive upon each label before it is delivered to the transfer pad. A further object is to provide, in a labeling machine of the type wherein a separable-blade picker is coated with adhesive before it enters the label magazine and wherein the label picker dwells after removing the label from the magazine and before the label is brought into contact with the transfer pad, means operative, by suction to prevent the label from moving while the picker blades are being separated. A further object is to provide, in a labeling machine of the kind wherein a separable-blade picker takes a label from the magazine and delivers it to a transfer pad at a transfer point, a label-gripping element having suction orifices and which is operative, after the picker has removed a label from the magazine and before it has delivered the label to the transfer pad, to contact the label and by suction, to prevent movement of the label while the picker blades are being separated. A further object is to provide, in a labeling machine of the kind wherein labels are withdrawn from the magazine by a separable-blade, gum-coated picker and delivered by the latter to a suction transfer pad at a transfer station intermediate the label magazine and the article to be labeled, means comprising a pad, of an area substantially as great as that of the label, against which the ungummed face of the label is clamped by the picker blades before the latter begin to separate. A further object is to provide, in a labeling machine of the kind wherein labels are withdrawn from the magazine by a separable-blade, gum-coated picker and delivered by the latter to a suction transfer pad whose width is substantially less than that of the label and which passes between the separated blades in taking the label from the picker at a transfer station, a substantially flat pad, of a superficial area substantially as large as the label, against which the ungummed face of the label is pressed by the picker before the picker arrives at the transfer station. A further object is to provide, in a labeling machine of the kind wherein a separable-blade picker withdraws a label from a magazine and delivers it at a transfer point to a transfer pad and wherein the blades of the picker have slots for the accommodation of the label-holding hooks of the magazine, means whereby, after the picker has withdrawn a label from the magazine and before it has delivered the label to the transfer pad, the gum is uniformly spread over the entire area of the label.

Other and further objects and advantages of the invention will be pointed out in the following more detailed description and by reference to the accompanying drawings wherein.

Figure 1:
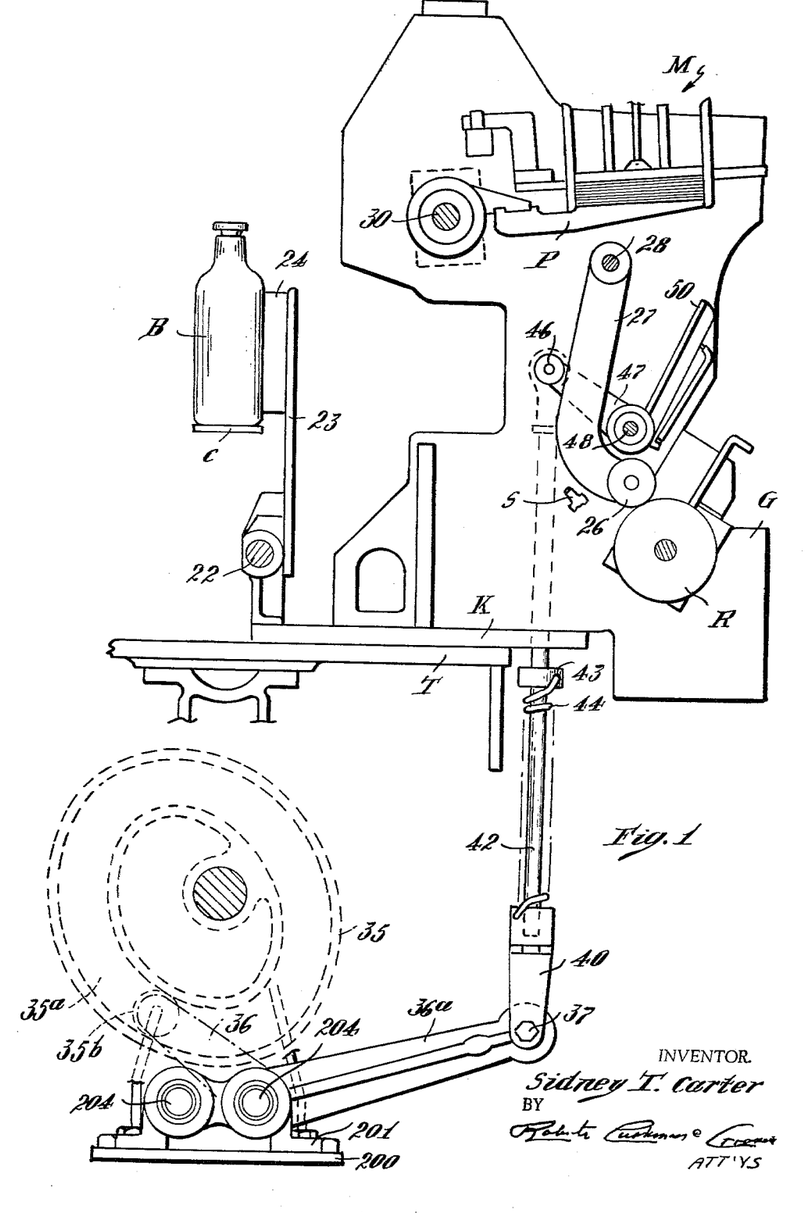
FIG. 1 is a fragmentary, diagrammatic end elevation partly in vertical section, illustrative of a labeling machine of a well-known type, but having the apparatus of the present invention embodied therein, the picker being shown in position to take a label from the magazine; the grip-finger suction pad being in position to apply a label to a bottle; and the label pressure-applying and retaining means, of the present invention, being shown in fully retracted position.

Referring to FIG. 1 of the drawings, wherein there are diagrammatically indicated certain conventional features of a labeling machine of a well-known commercial type, the numeral 200 designates the base member of such a machine, this base member having mounted thereon brackets 201 which support parallel shafts 204 which provide fulcrums for a plurality of rock levers which are actuated, in properly timed relation, by cams mounted on the main drive shaft 119 of the machine. Among those cam-actuated levers (not here shown) is one which rocks the shaft 22 (mounted in bearings carried by the table T of the machine), to which there is attached the grip-finger assembly 23 which includes the pressure-applying pad 24, by means of which a gum-coated body label is carried from a transfer position into adhering contact with the article to be labeled, here shown as a bottle B mounted on the conveyor C. It will be understood that the grip-finger suction pad 24 will be of conventional or any suitable type, for example, such as shown in FIG. 3 of the copending application for Letters Patent Serial No. 257,898, filed February 12, 1963 by Sidney T. Carter, or in FIG. 3 of copending application for Letters Patent Serial No. 81,541, now Patent No. 3,134,707 filed January 9, 1961 by Sidney T. Carter, and that, as described in the United States patent to Carter, No. 2,940,630, dated June 14, 1960, the air port or ports in the face of the pad is or are connected to a source of vacuum and a source of pressure with suitable valves (not herein shown) for controlling vacuum or pressure at the suction pad and that the grip-finger will dwell momentarily just before contacting the label to insure that full vacuum has been built up so that the grip-finger will positively grip and hold the label, and that just as the grip-finger contacts the label with the bottle, suction is broken at the pad and the grip-finger is connected to air pressure, so that all trace of vacuum is first removed and then a slight pressure is built up to insure positive transfer of the label from the grip-finger to the bottle, the air pressure being maintained for a short period after the label has been adhered to the bottle and while the grip-finger is starting to move in the opposite direction so as to clean-out the passage in the grip-finger assembly.

Another of the levers (not here shown) which is fulcrumed on one of the shafts 204 and actuated by a cam on the shaft 119 is operative, by appropriate connections (not shown) to rock a shaft 28 (FIG. 1) to which arms 27 are fixed which support the gum transfer roll 26 which takes gum from a roll R, turning in a gum box G, and applies it to the surface of the picker P. The picker is mounted on a shaft 30 (FIGS. 1 and 2) which is rocked by a cam C' (FIG. 10) on the shaft 119 through suitable resiliently yieldable connections, such as hereafter described, and which, after receiving a coating of gum from the roll 26, is normally moved to the position shown in FIG. 1 where it enters the magazine M and contacts its gum-coated surface with the lowermost label in the magazine.

Figure 4:
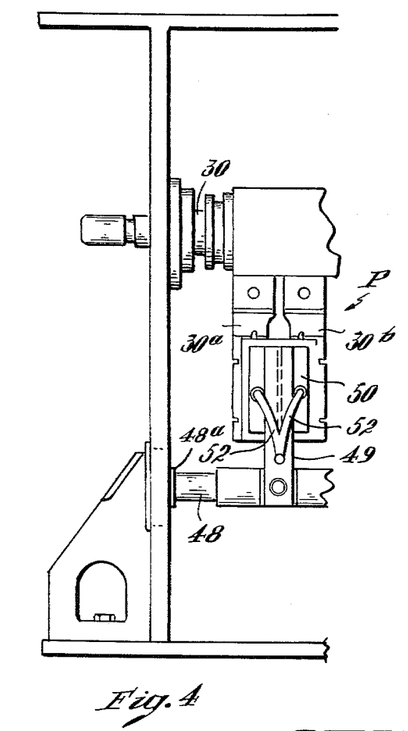
FIG. 4 is a view, in a plane defined by the axes of the picker shaft and the shaft on which the label-pressing and positioning device is mounted, showing the latter in operative relation to the picker as in FIG. 2.
Figure 5:
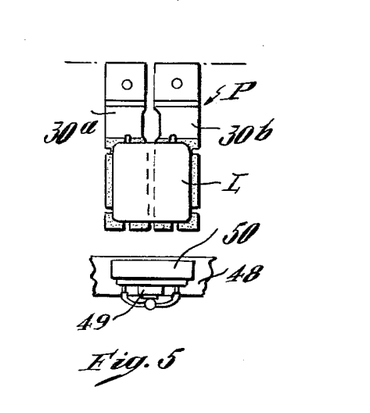
FIG. 5 is a view looking downwardly, illustrating the picker with its blades in edge-to-edge adjacent relation and carrying a label as it would appear when it has just retreated from the magazine, while the pressure-applying and positioning device occupies the inactive position as in FIG. 1.
Figure 6:
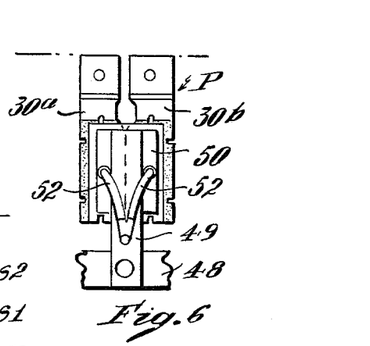
FIG. 6 is a view in the same plane as FIG. 4, showing only the picker and the label-retaining and pressing device at the instant when the latter first comes into contact with the label while the picker blades are still in the relative position of FIG. 5.

The picker P, as here shown, is of the separable-blade type such as is common in this art, for example, as disclosed in the patent to Holm, No. 1,901,101, dated March 14, 1933, comprising two blades 30a and 30b, respectively (FIG. 4), which are coplanar and in edge-to-edge relation and which, when the picker enters the magazine, as referred to above, are disposed with their adjacent edges substantially in contact, as illustrated, for example, in FIGS. 4, 5 and 6, so that together they present a substantially continuous gum-coated surface for contact with the label L (FIG. 5). However, if the picker is withdrawn from the magazine with its blades in substantial contact and with the label L adhering to the gummed faces of the picker blades, and the picker blades are then separated, although with their gummed faces still in the same plane, the label L is stretched across the space between the separated proximate edges of the blades and adheres to the respective blades along its opposite marginal portions only. As is customary, the picker blades have slots $S^1$ in their lateral edges and slots $S^2$ and $S^3$ in their upper and lower edges, respectively, for the accommodation of the customary hooks at the lower end of the magazine whereby the stack of labels is supported. Obviously, at the location of such a slot, there will be no gum for application to the label. In accordance with the present invention, the picker blades do not separate while the picker is within the magazine and thus the lateral slots $S^1$ may be of a length just sufficient to receive a hook, thus minimizing the area to which gum is not applied when the picker first contacts the label. Moreover, in accordance with the present invention, the slots $S^2$ and $S^3$ are spaced from the inner edges of the blades so that, as the blades separate, an unslotted portion of the blade will pass across the ungummed area of the label caused by the slot and thus spread gum over said area.

Usually a spring (not here shown) in the connections between the picker and its actuating cam permits the picker to yield in response to predetermined resistance when it enters the magazine. It will be understood that loading means, usually comprising a flat plate, rests on the topmost label in the magazine, this plate being resiliently loaded so as to urge the labels downwardly in the magazine whereby the picker, in moving up to take a label, will meet a resistance sufficient to insure adhesion of the label to the picker.

Figure 2:
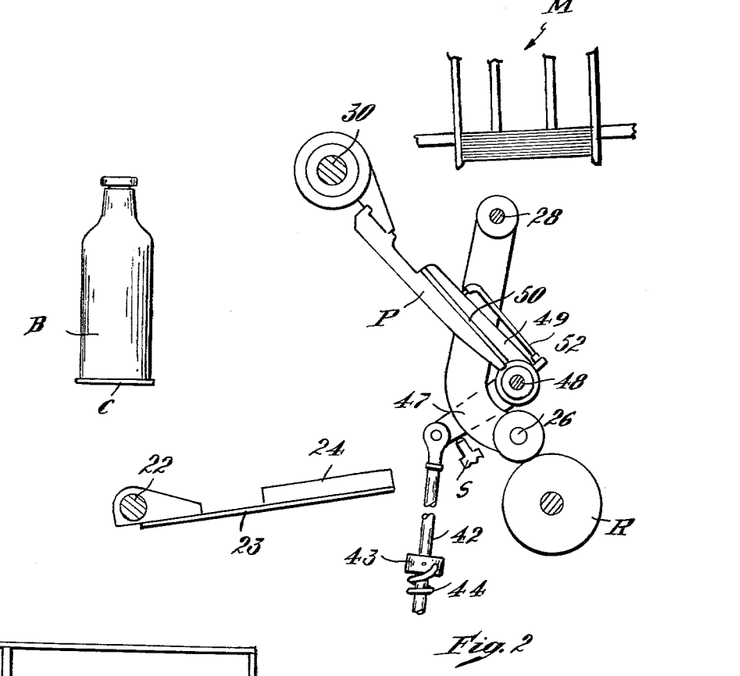
FIG. 2 is a view similar to FIG. 1, but omitting parts and showing the grip-finger as in retracted position; the picker as having removed a label from the magazine and being at an intermediate point in its path of travel between the magazine and the transfer point; and the label-positioning and pressure-applying device of the present invention, operatively associated with the picker.
Figure 2A:
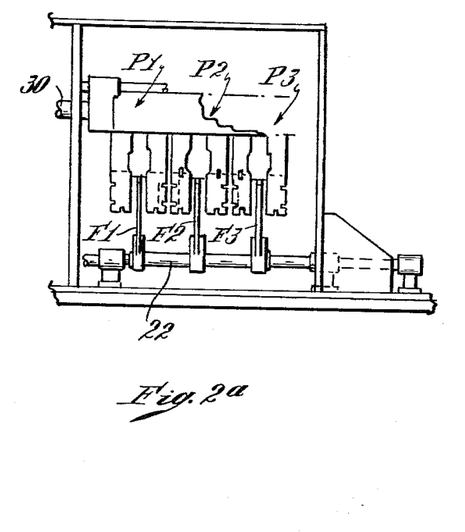
FIG. 2a is a fragmentary, diagrammatic elevation, to small scale, illustrative of a labeling machine of the kind which is designed to apply a label to each of three articles simultaneously.

FIG. 2a diagrammatically illustrates, by way of example, a labeling machine of a type in which the present invention may be embodied and which is designed to apply a label simultaneously to each, respectively, of a group of three articles. For this purpose, the machine has three separable-blade pickers $P^1$, $P^2$ and $P^3$ mounted upon the same shaft 30 and three corresponding suction-type grip-fingers $F^1$, $F^2$ and $F^3$ mounted upon a shaft 22, each grip-finger, as shown, being very substantially narrower than the associated picker when the blades of the latter are closed.

The above-described features, with the exceptions noted, are old and well-known in this art.

In accordance with the present invention, an additional cam 35 (FIG. 1) is fixed to the shaft 119, this cam having a groove 35a which receives a roll 35b carried by an arm 36 of a bell-crank lever fulcrumed on the shaft 204 and whose other arm 36a is pivotally connected at 37 to a fork member or shackle 40. The lower end of a rigid rod 42 has a sliding fit in a socket in the fork member or shackle 40 and is resiliently urged downwardly by a tension spring 44 having its upper end secured to a collar 43 fixed to the rod 42 and at its lower end to the shackle 40. The upper end of this rod 42 is pivotally connected at 46 to one arm 47 of a bell-crank lever arranged to rock upon a shaft 48 which turns in appropriate bearings, one of which is shown at 48a (FIG. 4) as carried by the machine frame.

Figure 9:
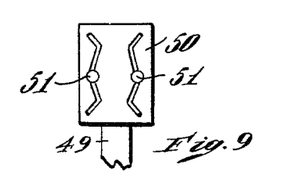
FIG. 9 is a face view of the label presser plate, showing its suction orifices.

Referring to FIG. 4, the shaft 48 is shown as provided with an arm 49 which carries the label-positioning and pressure-applying device of the present invention which, in a preferred form, comprises a clamping plate or pad 50 having a flat label-contacting face of approximately the dimensions of the label L which is to be applied. To insure uniform pressure, the label-contacting face of the plate or pad should be of soft rubber, or equivalent material, of a durometer hardness of 40 or less, and of a size and contour substantially like the label to be applied, although preferably so that about $\frac{1}{32}"$ of the label overlaps the pad at all edges. This latter feature allows for commercial tolerances in label sizes or slight misalignment of the label. This plate or pad 50 (FIG. 9) is provided, in its label-contacting face, with spaced suction orifices 51 which register with the ends of suction tubes 52 which are connected to an axial bore (not shown) in the shaft 48 which communicates with a vacuum pump or the like, with provision of conventional valves (not shown) for creating suction at the ports 51 at the proper times.

With this arrangement, as the lever arm 36a (FIG. 1) moves downwardly or in a clockwise direction, the lever arm 47 is also swung downwardly but in a counter-clockwise direction until it contacts a normally fixed but preferably adjustable stop S, as shown in FIG. 2, thus accurately locating the pad in the operative position relatively to the picker. Because the force for swinging the lever arm 47 toward the stop is transmitted through the spring 44, it is not necessary to provide for extreme accuracy in the motion-transmitting parts to avoid damage. When the lever arm 36a swings upwardly, motion is positively transmitted to the lever 47 by the rod 42, thus swinging the pad 50 back to its inoperative position as shown in FIG. 1.

Because, as shown in FIG. 1, the rod 42 is nearly vertical and because of the provision of the fixed stop S and the tension spring 44, the adjustment of the machine (by sliding the plate K to the right or left, FIG. 1, to accommodate bottles of different diameters), does not substantially vary the operative position of the pad 50.

Figure 3:
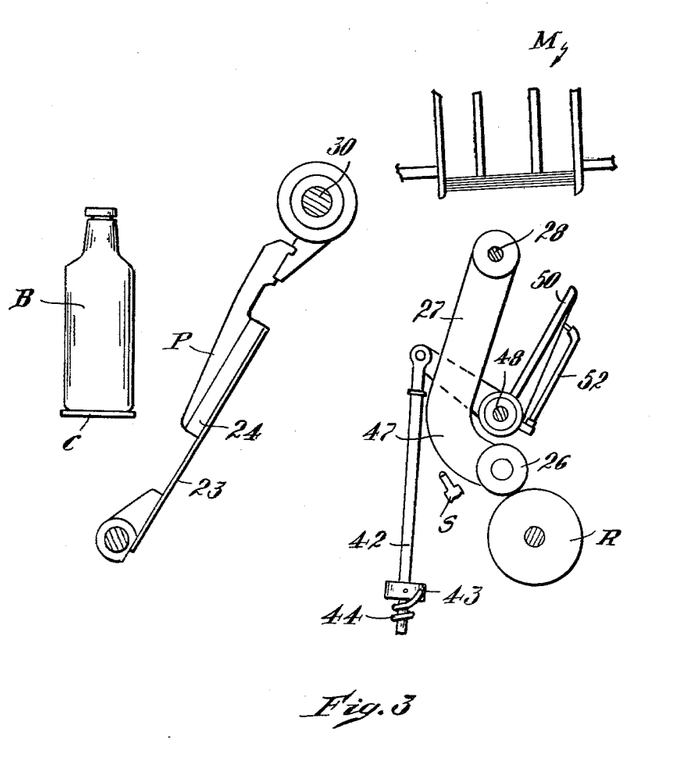
FIG. 3 is another view generally simliar to FIG. 2, but showing the picker as having moved to the transfer position; the grip-finger assembly being in readiness to take a label from the picker; and the label-positioning and pressure-applying device, of the present invention, as having returned to its fully retracted position.
Figure 7:
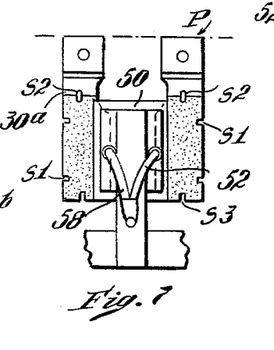
FIG. 7 is a view similar to FIG. 6, but showing the picker blades as having been fully separated.
Figure 8:
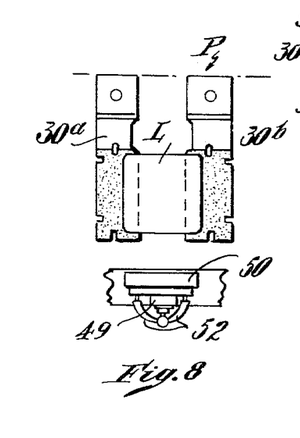
FIG. 8 is a view similar to FIG. 5, but with the picker blades separated and holding the label by its margins, while the presser plate and positioning device has returned to its initial position.

The picker-actuating cam $C^1$ (FIG. 10) and the cam 35 are so contoured that when the gum-coated picker (having taken a label from the magazine and with its blades still closed) is dwelling in the position indicated in FIG. 2, the bell-crank lever, comprising the arm 47, will rock so that, just before said arm contacts the stop S, the pad 50 will clamp the label against the picker blades. By properly locating the stop S and by using a spring 42, which is stronger than the yieldable connections between the picker and its actuting cam, a predetermined pressure is applied to the label without danger of damage, while, at the same time, the pad is accurately positioned by the stop relatively to the picker. The blades of the picker are now in the position indicated in FIG. 4, with their adjacent edges in substantial contact and, as thus positioned, the pad 50 covers substantially the entire surface of the label L. Suction is now established at the ports 51 in the pad and the pad 50 remains in contact with the label while, by conventional means provided, but not here shown in detail, the blades 30a and 30b of the picker P are moved sidewise away from each other to the position shown in FIG. 7. Because of the suction created at the orifices 51, the label is held firmly to the plate 50. As the blades of the picker separate, the label, being gripped by the suction at the ports 51, is prevented from moving with the picker blades or from twisting, or from dropping from the picker, while the relative motion of the blades and the stationary label evenly spreads the adhesive over the entire area of the label, including those small areas which initially registered with the slots $S^1$, $S^2$ and $S^3$, so that at the completion of the separation of the picker blades, the label is disposed, as shown in FIG. 8, with equal portions of its surface adhering to the respective blades, and with its lateral edges parallel to the lateral edges of the picker blades. After the blades have separated to their maximum extent, suction at the orifices 51 is broken and the cam 35 returns the shaft 48 to the position shown in FIG. 1, wherein the plate 50 is in its normal or inoperative position. The picker now moves to the position shown in FIG. 3, that is to say, the transfer position, where the grip-finger assembly, comprising the pad 24, moves up and into contact with the exposed face of the label and, having gripped the label by suction, continues on upwardly to the position shown in FIG. 1 where it applies the label to the bottle.

In order to prevent application of excess gum to the picker, or the application of gum to the clamping plate or pad 50 when, for example, the machine, although running, is not receiving articles to be labeled, the present invention provides means whereby, under such circumstances, the picker is prevented from entering the magazine or contacting the pad 50.

As above noted, the picker P is mounted on the rock-shaft 30. This rock-shaft is provided with a crankarm 210 (FIG. 10) and, in accordance with the present invention, the crankarm is preferably rocked by a rigid link 211 pivotally connected to the crankarm at 212. A piston 213 is fixed to the lower portion of the link 211 and slides in a cylinder 214. The cylinder 214 has an inlet port at 215 and an exhaust port at 216. The link 211 extends down below the piston 213, as shown at 211a, to provide, by contact with the bottom of the cylinder, a limiting stop for the link.

Compressed air is admitted to the cylinder and exhausted therefrom by valve means (not shown) which is automatically controlled in response to the presence or absence of articles at the feed-end of the labeling machine. By way of example, the valve 234, described in the patent to Carter, No. 2,940,630, dated June 14, 1960, is thus responsive to the presence or absence of articles at the feed-end of the machine.

The lower end of the cylinder 214 is pivotally attached at 217 to the long arm 218 of a bell-crank lever mounted on a shaft 204 and whose other arm 220 is provided with a cam follower roll 221 which is disposed in a groove 222 in a cam C' fixed to the main shaft 119 of the labeling machine. When articles, in sufficient number, are being supplied to the labeling machine, the picker, after receiving a coating of gum from the roll 26, is moved to the position shown in FIGS. 1 and 10, where it enters the magazine M and contacts its gum-coated surface with the lowermost label in the magazine.

It is apparent that the distance between the pivots 212 and 217 varies with the position of the piston 213 to the cylinder 214. Normally, when the labeling machine is operating with a full supply of articles, the aforesaid control valve will be so set that air is admitted to the cylinder through the port 216 and the piston will then occupy the position in the cylinder shown in FIG. 10. The pivots 212 and 217 are now at a maximum distance apart and, as the lever arm 218 rocks upwardly, the picker will enter the label magazine with its blades closed to contact the lowermost label, and when the arm 218 rocks downwardly, the picker, with its blades still closed, will swing down to the position shown in FIG. 2 where it dwells with the label clamped between the pad 50 and the picker. While the parts so dwell and the label is firmly gripped to the pad 50 by suction, the blades of the picker separate, thus spreading the gum uniformly over the entire surface of the label. The piston and cylinder, interposed between the picker and its actuating cam C', permit the picker to yield slightly in response to excess pressure as it contacts the lowermost label in the magazine, the piston and cylinder thus functioning like the customary compression spring. The groove in cam C' is so contoured that, when the machine is operating in normal fashion, the picker moves from the position shown in FIGS. 1 and 10 to that shown in FIG. 2, dwelling in the latter position while the picker blades separate; then continuing onto the transfer position (FIG. 3); and then moving back, in timed relation to the gum transfer roll 26, so that the latter may apply a fresh coating of gum to the picker before the latter again enters the magazine.

Figure 11:
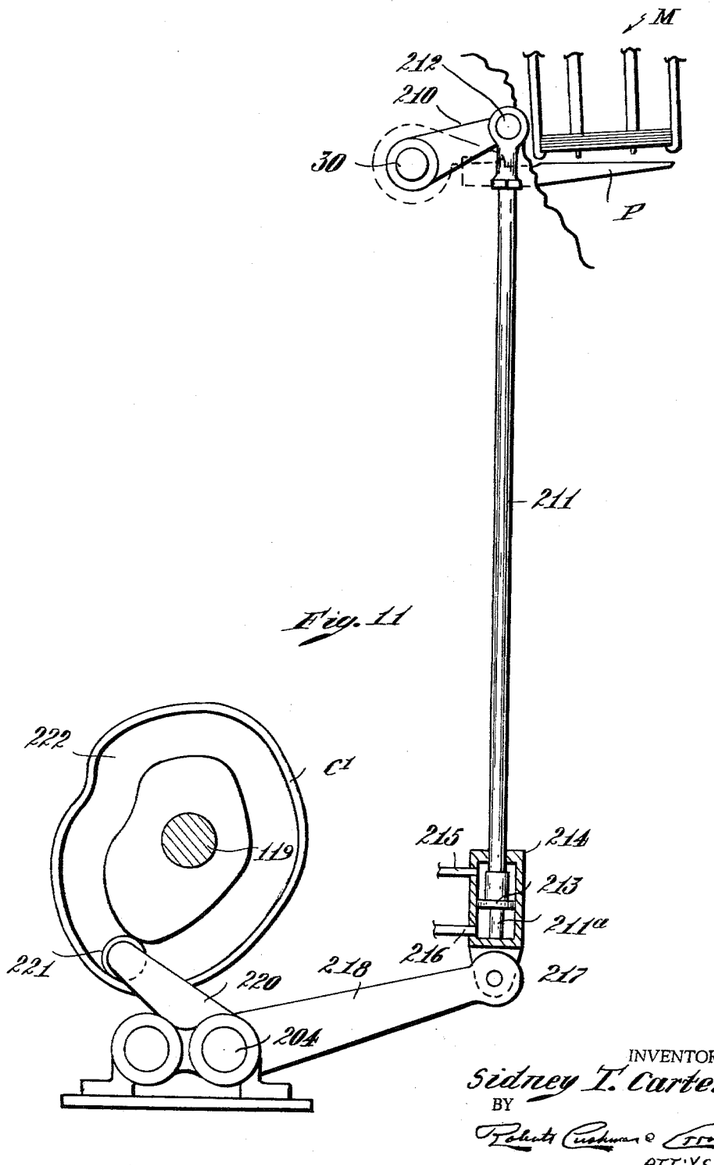
Figure 12:
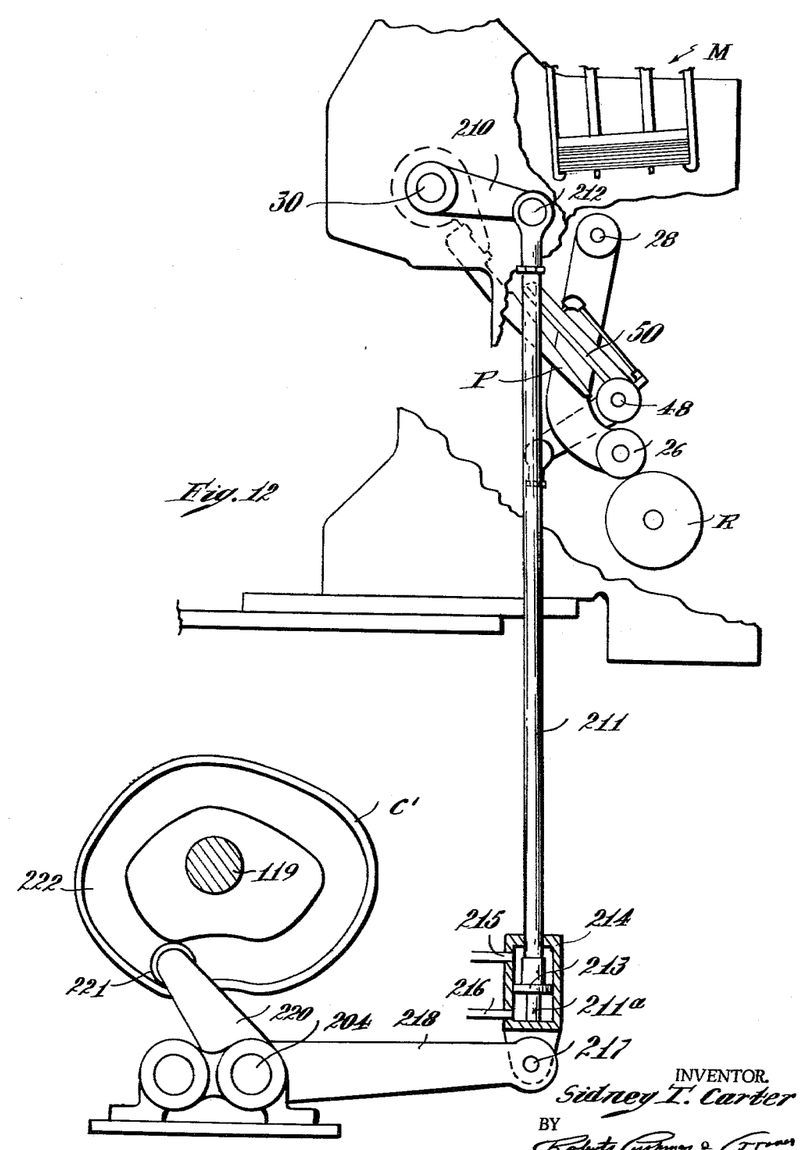

Assuming that the labeling machine is of the kind disclosed in the above patent to Carter, the machine will be running at very low speed if an insufficient number of articles is being presented and automatically increases in speed when a sufficient number of articles are being supplied to insure a constant run. The change from low to higher speed can only occur after articles have passed the detecting position, indicated by the switches 160, 161 of the patented machine, it being impractical to actuate the picker control at high speed. Assuming that the speed control is like that disclosed in the aforesaid patent to Carter, then, when the detector switches indicate that no article is present at the detecting point, the machine automatically drops to low speed and, after the transfer roll 26 leaves the end of the picker, but before the picker enters the magazine, the control valve allows air to enter the cylinder 210 through the port 215. This, in effect, shortens the distance between the pivots 212 and 217 and, as the cam C' continues to turn, moving the picker closer to the label magazine, the upward motion of the picker terminates, as shown in FIG. 11, before the picker can contact a label. As will be noted in FIG. 11, the piston 213 is now approximately midway between the ports 215 and 216 and the extension 211a is in contact with the bottom of the cylinder, thus holding the picker in a definite position relatively to the lowermost label. In this position, the picker is unable to take a label. The air pressure being maintained at the port 215 and the cam C' continuing to turn, the picker, in moving downwardly, arrives at a dwell position as shown in FIG. 12, where it is spaced from the clamping pad 50. This is desirable because the picker has not received a label from the magazine and, if its gum-coated surface were to contact the pad 50, it would coat the latter with adhesive and this would necessarily have to be removed before the machine could resume normal operations.

Figure 10:
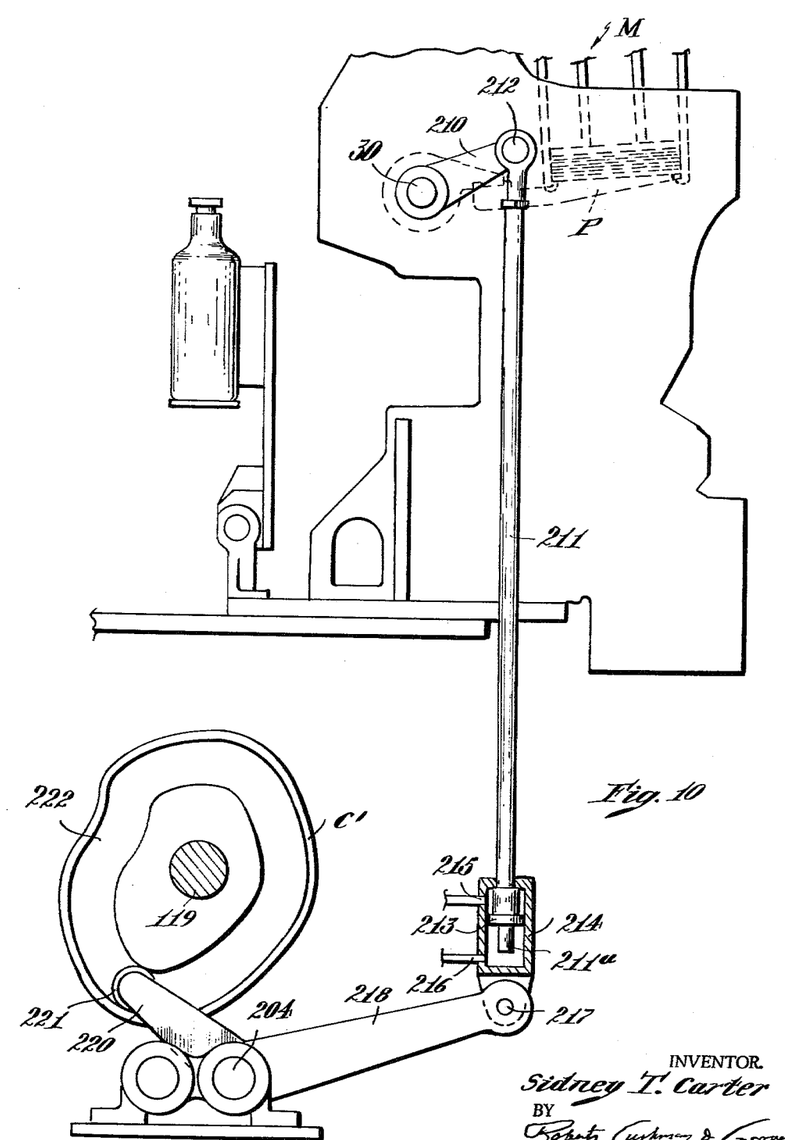
FIGS. 10, 11 and 12 are fragmentary, diagrammatic end elevations (partly in vertical section in a plane parallel to that of FIG. 1) illustrative of a novel picker-actuating mechanism and showing the picker in different positions respectively.

Assuming that before the cam C' has completed its cycle, articles in proper numbers are being delivered to the labeling machine, the machine resumes operating speed and the control valve will be automatically so shifted as to exhaust air at the port 215 and deliver it into the cylinder through the port 216, thus restoring the piston 213 to the position shown in FIG. 10, so that, as the picker again approaches the magazine, the effective length of the link 211 will be normal and the picker will enter the magazine as shown in FIG. 10.

While herein a cylinder and piston have been suggested as a simple means for varying the picker motion, mechanical means, such, for example, as is disclosed in the aforesaid patent to Carter, No. 2,940,630, may be employed if desired.

By the means thus described, it is assured that the label will not become displaced either by reason of the relative movement of the picker blades or because of lack of adhesion to the blades; with substantially equal areas of the label adhering to the respective blades; with the label properly centered to be taken by the suction grip-finger and transferred with certainty to the article to be labeled.

Instead of using the fixed stop, as above described, and a tension spring in the connections for actuating the pad-carrying lever, the simple rod 42 and spring (here shown) might be replaced by a rod having right and left screw threads at its opposite ends, connecting the rod by means, for example, of Heim or Unibal bearings to the levers 36a and 37 respectively, so that, by turning the rod, its effective length could be very accurately adjusted from time-to-time, thus determining the pressure applied by the pad to the label resting on the picker.

While one desirable embodiment of the invention has herein been illustrated by way of example, it is to be understood that the invention is broadly inclusive of any and all modifications or equivalents falling within the terms of the appended claims.

I claim:

1. In a labeling machine of the kind wherein a two-bladed, gum-coated picker removes labels from a magazine while its blades are closed and carries the label to a transfer station where the label is taken from the picker by a transfer device, in combination, means operative to separate the picker blades before the picker arrives at the transfer station, and means operative to press the label against the picker blades while the latter are separating.

2. In a labeling machine of the kind wherein a two-bladed, gum-coated picker removes labels from a magazine while its blades are closed and carries the label to a transfer station where a suction picker, of a width substantially less than that of the label, passes between the previously separated blades and takes the label from the picker, in combination, means operative to separate the picker blades before the picker arrives at the transfer station, and means operative to press the label against the blades while the latter are separating.

3. In a labeling machine of the kind wherein a separable-blade, gum-coated picker removes labels from a magazine while its blades are closed and carries the label to a transfer station where the label is taken from the picker by a transfer device, in combination, means operative to separate the picker blades before the picker arrives at the transfer station, and means operative to prevent orientation of the label relatively to the picker blades as the latter are separated.

4. In a labeling machine of the kind wherein labels are removed from a magazine by a separable-blade, gum-coated picker which carries the label to a transfer station at which the label is taken from the picker by a transfer pad which applies the label to the article to be labeled, and wherein the blades of the picker are closed when it enters the magazine but separate after leaving the magazine but before the picker arrives at the transfer station so that lateral portions, only, of the label then adhere to the picker, in combination, a pressure-applying member having a label-contacting face, and means for so actuating said member as to bring said face into pressure-applying contact with the exposed face of the label just before the blades of the picker separate.

5. In a labeling machine of the kind wherein labels are removed from a magazine by a two-bladed, gum-coated picker whose blades are closed when it enters the magazine but separate immediately after leaving the magazine so that spaced areas, only, of the label then adhere to the picker, in combination, a label-clamping element having a label-contacting face whose superficial area is approximately of the shape and size of the label, and means for so relatively arranging the picker and clamping element as to clamp the label between them just before the blades of the picker separate.

6. The combination according to claim 5, wherein the means for actuating the clamping element is so devised and arranged as to keep the clamping element in contact with the exposed face of the label until the separation of the picker blades is completed.

7. The combination according to claim 5, wherein the clamping element has air ducts opening at its label-contacting surface, and means for creating suction in said ducts as said label-contacting surface engages the exposed face of the label.

8. In a labeling machine of the kind which applies a label to each of a plurality of articles simultaneously during each cycle of the machine and which includes individual pickers, in number equal to the number of articles to be labeled, transfer pads each operative to take a label from one, respectively, of said pickers and apply it to one of the articles to be labeled, each transfer pad being of a width substantially less than that of the label and each picker being of the separable-blade type, a magazine from which each respective picker takes a label while the blades of the picker are closed, and means for separating the blades of each picker, after it has withdrawn a label from the magazine, so that the pad may pass between them, in combination, means operative to apply pressure to the exposed face of the label while the picker blades are separating.

9. In a labeling machine of the kind which applies a label to each of a plurality of articles simultaneously during each cycle of the machine and which includes individual pickers, in number equal to the number of articles to be labeled, transfer pads each operative to take a label from one, respectively, of said pickers and apply it to one of the articles to be labeled, each transfer pad being of a width substantially less than that of the label and each picker being of the separable-blade type, a magazine from which each respective picker takes a label while the blades of the picker are closed, and means for separating the blades of each picker, after it has withdrawn a label from the magazine, so that the pad may pass between them, in combination, means operative to insure that equal areas of the label will adhere to the respective blades after the latter have separated.

10. In a labeling machine of the kind which applies a label to each of a plurality of articles simultaneously during each cycle of the machine and which includes individual pickers, in number equal to the number of articles to be labeled, transfer pads each operative to take a label from one, respectively, of said pickers and apply it to one of the articles to be labeled, each transfer pad being of a width substantially less than that of the label and each picker being of the separable-blade type, a magazine from which each respective picker takes a label while the blades of the picker are closed, and means for separating the blades of each picker, after it has withdrawn a label from the magazine, so that the pad may pass between the blades, in combination, means operative to prevent orientation of the label relatively to the picker blades as the latter are separated.

11. In a labeling machine of the kind in which a two-bladed, gum-coated picker receives labels from a magazine while its blades are closed and carries the label to a transfer station at which the label is taken from the picker by a transfer pad which applies the label to the article to be labeled, the transfer pad being of a width substantially less than that of the label, means for separating the blades after the picker has taken a label from the magazine but before it arrives at the transfer station, in combination, a suction device having suction ports spaced apart a fixed distance which approximates the width of the space between the picker blades when they are fully separated, and means for moving said suction device into contact with the exposed face of the label while the picker blades are still closed and for creating suction at said ports before the picker blades open thereby to prevent lateral motion of the label in one direction or the other from its initial position as the blades separate.

12. In a labeling machine of the kind in which a separable-blade, gum-coated picker receives labels from a magazine while its blades are closed and carries the label to a transfer station at which the label is taken from the picker by a transfer pad which applies the label to an article to be labeled, and wherein each blade of the picker has a slot at its upper and lower edges, respectively, for the accommodation of the usual label-retaining hooks of the magazine, each of said slots being located nearer to the inner edges of its respective picker blade than to its outer edge, and means for separating the blades after the picker has withdrawn a label from the magazine, in combination, means for gripping the label, while the picker blades are closed, at points equidistant from the center of the label and thereby holding the label stationary as the blades open.

13. The combination according to claim 12, wherein the means for gripping the label comprises a part having spaced suction orifices, means for moving said part to apply said orifices to the label, and means for creating suction at said orifices while said part is in contact with the label.

14. In a labeling machine of the kind in which a two-bladed, gum-coated picker receives labels from a magazine while its blades are closed and carries the label to a transfer station at which the label is taken from the picker by a transfer pad which applies the label to the article to be labeled, means for separating the blades after the picker has withdrawn a label from the magazine but before the picker has arrived at the transfer station, in combination, means operative concomitantly to apply pressure to the exposed face of the label while the blades are being separated and to so grip the label as to prevent it from moving laterally in either direction during the separation of the blades.

15. The combination according to claim 14, comprising means whereby the pressure-applying means is resiliently urged toward the picker so as to clamp the label between the picker and the pressure-applying means while the blades are separating.

16. In a labeling machine of the kind wherein labels are withdrawn from a magazine by a gum-coated picker which swings in an arc from label-picking position to a transfer position at which the label is removed from the picker, in combination, a presser device which rocks about an axis parallel to that about which the picker swings, and means for so rocking the presser device as to cause it to contact the label while the picker is in a position intermediate the picking position and the transfer position.

17. In a labeling machine of the kind which comprises a picker which, after receiving a coating of gum, rocks in an arc from label-picking position, where it takes a label from a magazine, to a transfer position at which the label is removed from the picker, in combination, a presser pad which rocks about an axis parallel to that about which the picker rocks, from an idle position to a position where it contacts the label carried by the picker, and means for rocking the picker and the presser pad in timed relation such that the pad contacts the label on the picker before the picker arrives at the transfer station.

18. The combination according to claim 17, wherein the picker and presser pad are actuated by constantly rotating cams, the cams being so contoured that as the picker, carrying a label taken from the magazine, is on its way to the transfer position, the pad is brought into contact with the label.

19. The combination according to claim 17, wherein the picker and presser-applying pad are actuated by cams fixed to a rotating shaft, said cams being so contoured that as the picker, carrying a label, approaches the transfer point, the pad overtakes the picker and contacts the label, and means operative so to limit such motion of the pad as to avoid the application of damaging force to the picker by the pad.

20. The combination according to claim 17, wherein the pad is mounted on one arm of a rigid bell-crank lever and a normally fixed stop, disposed in the path of one of the arms of said bell-crank lever, is so positioned as positively to limit motion of the pad as it approaches the picker thereby accurately to locate the pad relatively to the picker, with the label interposed between the picker and pad.

21. The combination according to claim 18, wherein resiliently yieldable elements are interposed in the connections which transmit motion from the respective cams to the picker and presser pad, and a positive stop limits motion of the presser pad toward the picker, the cams being so contoured that the pressure contacts the label on the picker with resilient pressure before its motion is terminated by the stop.

22. The combination according to claim 18, wherein motion is transmitted to the presser element from its actuating cam by means of a tension spring, and a stop is arranged positively to terminate motion of the presser pad toward the picker thereby to position the pad accurately relatively to the picker.

23. In combination, in a labeling machine of the kind wherein articles to be labeled are advanced through a labeling zone and where, as an article enters the labeling zone, a separable-blade, gum-coated picker takes a label from the magazine and delivers it to a transfer pad at a transfer station, and having means for separating the picker blades after the picker has left the magazine but before it arrives at the transfer station, in combination, means normally operative to clamp a label against the picker before the picker blades separate, and means operative, in the absence of articles at the entrance to the labeling zone, to prevent the clamping means from reaching its operative position relatively to the picker.

24. In combination, in a labeling machine of the kind wherein articles to be labeled are advanced through a labeling zone and wherein, as an article is entering the labeling zone, a separable-blade, gum-coated picker takes a label from the magazine and delivers it to a transfer pad at a transfer station, and having means for separating the picker blades after the picker has left the magazine but before it has arrived at the transfer station, in combination, means normally operative to clamp the label against the picker before the picker blades separate, and means operative, in the absence of articles at the entrance to the labeling zone, to prevent the picker from taking a label from the magazine and to prevent the clamping means from approaching the picker so closely as to receive gum from the latter.

25. The combination according to claim 24, wherein, for preventing the label-clamping means and the picker from contacting, the means for actuating the picker comprises a rigid link for transmitting motion from an actuating cam to the clamping means, and means responsive to the absence of articles at the entrance to the labeling zone to change the effective length of said link.

26. The combination according to claim 25, wherein, for changing the effective length of the link, one end of the link carries a piston which slides within a cylinder, and means responsive to the presence or absence, respectively, of articles at the entrance to the labeling zone for determining the position of the piston within the cylinder.

References Cited by the Examiner

UNITED STATES PATENTS

| | | | |
|---|---|---|---|
| 1,901,101 | 3/33 | Holm | 118—236 |
| 2,733,683 | 2/56 | Holm | 118—236 |
| 2,940,630 | 6/60 | Carter | 156—488 |

EARL M. BERGERT, *Primary Examiner.*